United States Patent [19]

Nielinger et al.

[11] 3,983,306

[45] Sept. 28, 1976

[54] COMPOSITE SHEET STRUCTURES

[75] Inventors: Werner Nielinger; Rolf Dhein; Ulrich Haberland; Dietrich Michael; Karl-Heinz Hermann, all of Krefeld, Germany

[73] Assignee: Bayer Aktiengesellschaft, Leverkusen, Germany

[22] Filed: Feb. 22, 1974

[21] Appl. No.: 445,295

[30] Foreign Application Priority Data

Feb. 24, 1973 Germany............................ 2309420

[52] U.S. Cl............................ 428/474; 206/45.33; 206/484; 206/819; 426/127; 428/420; 428/500
[51] Int. Cl.².................... B32B 27/32; B32B 27/34
[58] Field of Search............ 161/227, 247, 408–410; 426/127; 206/819, 45.33, 484, 84; 428/474, 500, 420

[56] References Cited

UNITED STATES PATENTS

| | | | |
|---|---|---|---|
| 3,184,358 | 5/1965 | Utz...................................... | 156/244 |
| 3,352,913 | 11/1967 | Schmitt et al........................ | 260/563 |
| 3,352,942 | 11/1967 | Schmitt et al........................ | 260/857 |
| 3,570,748 | 3/1971 | Coyle................................... | 161/227 X |
| 3,622,439 | 11/1971 | Manne et al......................... | 161/227 X |
| 3,630,826 | 12/1971 | Rose et al............................ | 161/227 X |
| 3,669,827 | 6/1972 | Kolyer et al......................... | 161/227 |
| R27,939 | 3/1974 | Raabe................................. | 161/227 X |

*Primary Examiner*—Harold Ansher
*Attorney, Agent, or Firm*—Plumley & Tyner

[57] ABSTRACT

Composite sheet structures of polyethylene and of copolyamides of ε-caprolactam, 3-aminomethyl-3,5,5-trimethyl-cyclohexylamine and isophthalic acid.

5 Claims, No Drawings

COMPOSITE SHEET STRUCTURES

This invention relates to transparent multilayered sheet structures of copolyamides of ε-caprolactam, 3-aminomethyl-3,5,5-trimethyl-cyclohexylamine and isophthalic acid, and of polyethylene.

Composite sheet structures of polyamides and polyethylene are distinguished by numerous advantageous properties such as their high strength, ability to be heat-sealed and low permeability to moisture, fats and gases, such as oxygen and carbon dioxide, whereas sheets of polyamide alone or polyethylene alone are missing many of these properties. Since composite sheet structures are frequently used for packaging food-stuffs, they should also be transparent and glossy. In addition, the starting polymer materials should be easy to work up into the composite sheet structures and the sheet structures themselves should be easy to handle in the packaging process.

Composite sheet structures can be produced by coating or laminating individual sheet materials or by coextrusion. The polyamide components particularly suitable for coextrusion are only copolyamides because homopolyamides do not result in sufficiently transparent sheet structures owing to their tendency to form larger spherulite.

Copolyamides of ε-caprolactam and/or 11-aminoundecanoic acid, 3-aminomethyl-3,5,5-trimethyl-cyclohexylamine and dicarboxylic acids are described in U.S. Pat. No. 3,352,942 equivalent to British Pat. No. 1,086,832. The various polyamide components are used in such proportions that the resulting copolyamides are all readily soluble in methanol and can be worked up from alcoholic solutions. The products are intended for use in the lacquer industry, as finishing coats on imitation leather and as coating materials. Soluble copolyamides of this kind are not suitable for the manufacture of sheet structures for packaging because they are readily attacked by solvents and especially by the solvents contained in the printing inks.

Other copolyamides, including those of lauric lactam, 3-aminomethyl-3,5,5-trimethyl-cyclohexylamine and isophthalic acid, are used for producing single-layered and multi-layered sheet structures in accordance with Deutsche offenlegungschrift No. 1,965,479. However, the melting point of these copolyamides is within the melting range of polyethylene. This makes it very difficult to use these composite sheet structures for packaging, because during the welding of the sheet there is a risk of the polyamide constituents also being melted.

It has now surprisingly been found that all these disadvantages can be overcome by producing composite sheet structures of polyethylene and of copolyamides from ε-caprolactam, 3-aminomethyl-3,5,5-trimethyl-cyclohexylamine and isophthalic acid, the copolyamide in a very particular composition. In addition to being highly transparent, these composite sheet structures are distinguished by their high resistance to organic solvents such as alcohols or hydrocarbons so that they can easily be printed on with printing inks which contain solvents. Their melting point is also sufficiently high to enable the composite sheet structures to be safely and rapidly welded at the usual high heat sealing temperatures.

This invention therefore relates to transparent composite sheet structures comprising at least a sheet of polyethylene and at least one sheet of a copolyamide consisting essentially of A. 85 – 98 % by weight, preferably 91 – 96 % by weight, of units of the formula (I)

and of

B. 2 – 15 % by weight, preferably 4 – 9 % by weight, of equimolar quantities of units of the formulae (II) and (III)

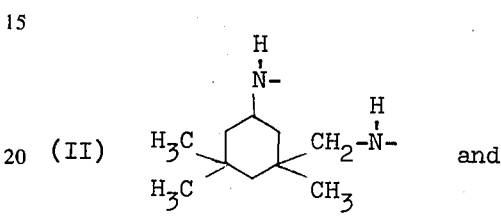

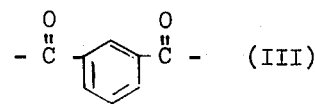

Another object of this invention is the use of the copolyamides described above for producing transparent multilayered sheet structures by coextrusion with polyethylene, using the usual bonding agents.

Polyethylenes of high density and low density obtained by known methods are useful for the coextrusion.

Production of the copolyamides is carried out by polycondensation of a mixture of ε-caprolactam, 3-aminomethyl-3,5,5-trimethyl-cyclohexylamine and isophthalic acid at temperatures of between 220° and 300°C by known methods such as solvent-free condensation.

The 3-aminomethyl-3,5,5-trimethyl-cyclohexylamine can be prepared by methods described in U.S. Pat. No. 3,352,913.

The composite sheet structures are produced in known manner by coextrusion, in particular by the blow-forming process. The usual bonding agents such as ozone, fluorine and ionomers (copolymers of ethylene and acrylic acid partly present as salt) are used. Any known form of after-treatment may be carried out on the composite sheet structures.

Composite sheet structures produced from these copolyamides are used as packaging material, in particular for packaging foodstuffs and technical products such as chemicals.

EXAMPLE 1

7.52 kg of ε-caprolactam (94 % by weight, based on the copolyamide), 0.272 kg of 3-aminomethyl-3,5,5-trimethyl-cyclohexylamine and 0.266 kg of isophthalic acid are polycondensed in a nitrogen atmosphere with stirring, first for 1 hour at 200°C and then for 7 hours at 270°C. The copolyamide is spun into a bath of water as a bristle which is chopped up, extracted with water at 95°C and dried.

The relative solution viscosity of the copolyamide is 4.00 determined on a one percent solution of the products in m-cresol at 25°C.

The copolyamide produced in this way is coextruded with a polyethylene which has a density of about 0.92 and a melt index of 0.3 – 0.5 in a commercial three-layered film blowing apparatus, using an ionomer, e.g. Surlyn A 1652 as bonding agent. The composite sheet structure produced in this way is inseparable, highly transparent and it has a high surface gloss and excellent deep-drawing capacity. By virtue of the high softening point of the copolyamide, which is 209°C, the product can easily be sealed in commercial packaging machines.

When a 6-polyamide is used instead of the copolymer, a cloudy composite sheet structure with a dull appearance is obtained which is not suitable for deep-drawing.

EXAMPLE 2

7.36 kg of ε-caprolactam (92 % by weight, based on the copolyamide), 0.363 kg of 3-aminomethyl-3,5,5-trimethylcyclohexylamine and 0.354 kg of isophthalic acid are polycondensed as described in Example 1. The copolyamide has a relative solution viscosity of 3.90 determined as in Example 1 and softens at 208°C.

Composite sheet structures with polyethylene which has the same properties as those described in Example 1 can be produced from this copolyamide by the method described in Example 1.

We claim:

1. Transparent composite sheet structures consisting essentially of at least one sheet of polyethylene directly bonded to at least one sheet of a copolyamide consisting essentially of
A. 85–98% by weight of units of the formula (I)

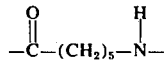   (I)

and of
B. 15–2% by weight of equimolar quantities of units of formulae II and III

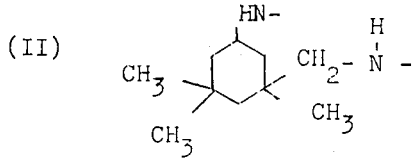

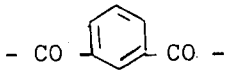

(III)

2. Structures as claimed in claim 1 in which the copolyamide consists essentially of (A) 91–96% by weight of units of formula I and of (B) 9–4% by weight of equimolar quantities of units of formulae II and III.

3. The structure of claim 1 in which the sheets are bonded after treatment with ozone or fluorine.

4. Transparent composite sheet structures consisting essentially of at least one sheet of polyethylene bonded to at least one sheet of a copolyamide consisting essentially of
A. 85–98% by weight of units of the formula (I)

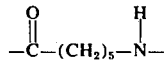   (I)

and of
B. 15–2% by weight of equimolar quantities of units of formulae II and III

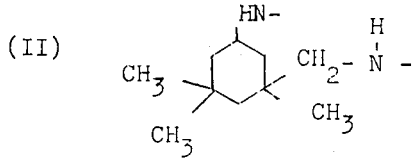

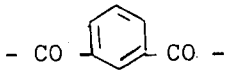

(III)

through an ionomer interlayer.

5. Structures as claimed in claim 4 in which the copolyamide consists essentially of (A) 91–96% by weight of units of formula I and of (B) 9–4% by weight of equimolar quantities of units of formulae II and III.

* * * * *